United States Patent [19]

Willemsen et al.

[11] Patent Number: 4,557,967

[45] Date of Patent: Dec. 10, 1985

[54] ADHESIVE-COATED MULTIFILAMENT YARN OF AN AROMATIC POLYAMIDE, A YARN PACKAGE, A CORD, A FABRIC, A REINFORCED OBJECT AND A PROCESS FOR MAKING SAID YARN

[75] Inventors: Stephanus Willemsen, Rheden; Willem E. Weening, Zevenaar; Anne Steenbergen, Westervoort, all of Netherlands

[73] Assignee: Akzo N.V., Arnhem, Netherlands

[21] Appl. No.: 547,491

[22] Filed: Nov. 1, 1983

[30] Foreign Application Priority Data

Nov. 2, 1982 [NL] Netherlands ................. 8204243

[51] Int. Cl.$^4$ .................................................. D03D 3/00
[52] U.S. Cl. .................................... 428/224; 57/251; 428/229; 428/261; 428/267; 428/343; 428/355; 428/395; 428/413; 428/492; 428/902
[58] Field of Search ............... 428/343, 375, 395, 413, 428/492, 902, 224, 229, 261, 267, 355; 57/251

[56] References Cited

U.S. PATENT DOCUMENTS

| | | | |
|---|---|---|---|
| 4,121,901 | 10/1978 | Bourrain et al. | 428/395 |
| 4,259,404 | 3/1981 | Gils | 428/395 |
| 4,343,843 | 8/1982 | Johnson et al. | 428/36 |
| 4,368,615 | 1/1983 | Lammers | 428/395 |
| 4,409,055 | 10/1983 | Elmer | 428/395 |
| 4,455,341 | 6/1984 | Harteman | 428/395 |

FOREIGN PATENT DOCUMENTS 1025310 4/1966 United Kingdom .
1035299 7/1966 United Kingdom .

OTHER PUBLICATIONS

Chemical Abstracts, Vol. 86, No. 16, Jul. 18, 1977, p. 67, No. 107 927K: Abstract of Japanese Patent Application No. 76 143 724, Asahi Chemical Industry Co., Ltd., 10-12-1976.

*Primary Examiner*—James J. Bell
*Attorney, Agent, or Firm*—Stevens, Davis, Miller & Mosher

[57] ABSTRACT

A multifilament yarn of an aromatic polyamide, in particular poly-p-phenylene terephthalamide, is provided with an adhesive coating of a cured epoxy compound, the yarn having a free epoxide content not higher than 10 mmoles/kg. The yarn is made by spinning a solution of an aromatic polyamide into a coagulation bath and subjecting the resulting filaments to the subsequent steps of washing, applying a curable epoxy compound and one or more alkaline curing agents, curing and winding the yarn thus treated into a package. The resulting yarn can be processed into a reinforcing element for, e.g., tires in a one-step dipping process. A cord made from the yarn displays an improved resorcinol-formaldehyde-latex dip pickup.

15 Claims, No Drawings

ADHESIVE-COATED MULTIFILAMENT YARN OF AN AROMATIC POLYAMIDE, A YARN PACKAGE, A CORD, A FABRIC, A REINFORCED OBJECT AND A PROCESS FOR MAKING SAID YARN

The invention relates to a multifilament yarn which entirely or substantially consists of an aromatic polyamide and is provided with an adhesive coating of a cured epoxy compound. The invention also relates to a method for the manufacture of such a yarn. The invention further relates to an object reinforced with fibres.

For yarns to be used as reinforcing material for rubber or synthetic materials they must generally be provided with a special coating which serves to ensure a satisfactory bond between the yarn and the object to be reinforced. To that end the conventional polyamide and rayon yarns, which are generally in the form of cord, are treated with a resorcinol-formaldehyde-latex mixture (RFL-dip) and subsequently cured for a while. With yarns of other materials, such as polyesters and aromatic polyamides, the above treatment does not lead to the degree of adhesion required and use must be made then of a two-step dipping system. Thus, in the process of improving their adhesion properties cords of poly-p-phenylene terephthalamide are pre-dipped in a first bath to provide them with a sub-coating of, for instance, an epoxy compound, which is cured at elevated temperature. In a second bath the cured sub-coating is provided with a layer of said resorcinol-formaldehyde-latex mixture, which is in its turn cured at elevated temperature. A process of the above type is known from U.S. Pat. Nos. 3,869,429 and 4,259,404. The above-mentioned two-step dipping process has great disadvantages. As this process cannot be carried out on the conventional one-dip equipment in use in yarn processing plants, processers of traditional yarns, such as rayon and nylon, who want to change over to yarns of poly-p-phenylene terephthalamide, will have to go to additional capital expenditure on dipping equipment or subcontract the process to convertors.

Moreover, the necessity of applying an epoxy compound to poly-p-phenylene terephthalamide yarns is a drawback to processers who exclusively apply the so-called self-adhering rubber mixtures, because they normally do not possess any dipping equipment at all. Further, the need for using two-step dipping constitutes a drawback in the case of processing blended yarns which partly consist of poly-p-phenylene terephthalamide and partly of a material which only requires a one-dip treatment, such as blended yarns of poly-p-phenylene terephthalamide and rayon. To remove the drawbacks to the two-step dipping of polyester yarns it has been proposed that the polyester yarn should be provided with an adhesive coating in the early stage of the production process. The yarn thus pre-treated can be processed then on available one-dip equipment. According to U.S. Pat. No. 3,383,242, for instance, a mixture of a diglycidyl ether and a heterocyclic or aliphatic amine is applied to freshly spun filaments of polyester, more particularly polyethylene terephthalate, prior to winding but concurrently with the application of a finishing agent, followed by curing. The filaments thus provided with a cured epoxy compound are subsequently made into a cord. This cord yarn can be subjected then to a one-step dipping process in which it is coated with the conventional resorcinol-formaldehyde-latex mixture.

According to U.S. Pat. No. 4,121,901 the use of heterocyclic or aliphatic amines in combination with glycidyl ethers has the disadvantage that it results in deterioration of the mechanical properties of the filaments thus treated. For that reason use is made of a composition containing a special epoxy compound, viz. tris(epoxypropoxy 2,3)-3-propionyl-1,3,5-hexahydro-s-triazine. According to Example 4b of said U.S. patent specification this compound is applied to the washed, nondried yarn during the wet spinning of poly-p-phenylene terephthalamide, after which the yarn thus treated is dried for 12 seconds at 165° C. and subsequently wound into a package.

A great disadvantage to the above-mentioned methods is that the resulting yarn has a high content of extractable free epoxide. Because of the high toxicity of free epoxy compounds plant operators taking part in the production and processing of the yarn are unduly exposed to substances that are injurious to health.

The above-mentioned drawbacks have been removed by the present invention. The invention relates to a multifilament yarn of the afore-mentioned type which is characterized in that the yarn has a free epoxide content not higher than 10 mmoles/kg. It is preferred that the free epoxide content should not be higher than 5 mmoles/kg, more particularly not higher than 2 mmoles/kg. The term free epoxide as used in the context of this invention refers to extractable free epoxide.

The aromatic polyamides to be used according to the invention are polyamides that are entirely or substantially built up of repeating units of the general formula:

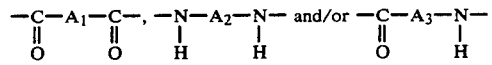

wherein $A_1$, $A_2$ and $A_3$ represent different or the same divalent, one or more aromatic rings-containing rigid radicals which may also contain a heterocyclic ring, of which radicals the chain extending bonds are in the position para to each other or are parallel and oppositely directed. Examples of these radicals include 1,4-phenylene, 4,4'-biphenylene, 1,5-naphthylene and 2,6-naphthylene.

They may contain substituents or not, e.g. halogen atoms or alkyl groups. In addition to amide groups and the above-mentioned aromatic radicals the chain molecules of the aromatic polyamides may optionally contain up to 35 mole % of other groups, such as m-phenylene groups, non-rigid groups, such as alkyl groups, or ether groups, urea groups or ester groups. It is preferred that the yarn according to the invention should entirely or substantially consist of poly-p-phenylene terephthalamide. The yarn according to the invention may be twisted or not. It is preferred that it should entirely or practically entirely be non-twisted.

The yarn according to the invention is provided with an adhesive coating which consists of a cured epoxy compound.

The epoxy compound used according to the invention has an average 2 to 4 epoxy groups per molecule and is applied to the yarn as an aqueous solution or dispersion or as an organic solution or dispersion which preferably contains 0,3 to 10% by weight of the epoxy compound. The amount of the epoxy compound in the solution or dispersion is so chosen that it has the desired viscosity and the desired amount of the epoxy compound is taken up by the yarn. After having been applied to the yarn, the epoxy compound is cured, so that a practically water-insoluble adhesive coating is formed having the desired adhesive properties. The amount of cured epoxy compound present on the yarn is 0.01–5% by weight and preferably 0,3 to 1,0% by weight. Examples of suitable epoxy compounds are described in U.S. Pat. No. 4,259,404. Also mixtures of epoxy compounds may be used.

It is preferred that the adhesive layer should consist of the cured product of a mixture containing an epoxy compound and one or more alkaline curing agents in the presence or absence of one or more catalysts. The epoxy compound to be used is preferably a glycidyl ether of a polyvalent aliphatic alcohol, such as butane diol, propane diol, ethylene glycol and glycerol.

Particularly preferred is a diglycidyl ether of glycerol. A preferred alkaline curing agent according to the invention is a heterocyclic amine. Particularly suitable is piperazine 6 aq. The amine is used in an amount of about 1 to 100%, preferably 5 to 25%, calculated on the weight of the glycidyl ether. A very effective and rapidly curing composition is a mixture containing the diglycidyl ether of glycerol, piperazine, imidazole and ethylene glycol. The amount of the imidazole to be contained in such a mixture is in the range of 1 to 100%, preferably 10 to 40%, calculated on the weight of the glycidyl ether.

Examples of suitable catalysts are: dicyanodiamide, borontrifluoride, tetramethyl-ethylenediamine, tetramethyl-butanediamine and 2.4.6-tris(dimethylaminomethyl)phenol.

The last-mentioned substance, which is preferably used, is commercially available under the name Epilink 230. The catalyst is used in an amount of 1 to 100%, preferably 5 to 25%, calculated on the weight of the glycidyl ether.

The multifilament yarn according to the invention may have any linear density and be composed of any number of endless filaments commonly used in actual practice. As a rule, the yarn will have a linear density in the range of dtex 10 to dtex 5000 and be composed of 10 to 5000 filaments. The yarn according to the invention has good mechanical properties. The tenacity is 10 to 35 cN/dtex or higher, preferably 15 to 25 cN/dtex. The elongation at rupture is 1 to 10%, preferably 2 to 8%. The initial modulus is 200 to 1300 cN/dtex or higher, preferably 300 to 900 cN/dtex. The yarn according to the invention has a low free epoxide content. It is preferred that the free epoxide content should be lower than 2 mmoles of epoxide per kg of yarn. This low free epoxide content permits producing and processing the yarn without any risk to the health of plant operators.

The yarn according to the invention has a low free epoxide content already immediately after it has been produced. In the course of time the free epoxide content generally continues to decrease. The low free epoxide content of the yarn according to the invention is obtained by the use of special processes as will be further described hereinafter.

An important property of the yarn according to the invention is that a cord made from it displays an improved RFL-dip pickup. For a proper cord to rubber adhesion a sufficiently high RFL-dip pickup is required. This may be realized according to the invention by applying and curing the epoxy compound while the yarn is entirely or practically entirely free of twist, which may for instance be a twist of fewer than 10 turns per meter. The yarn thus treated may subsequently be twisted. If the curable epoxy compound is applied to a highly twisted yarn, as described in Example VI of U.S. Pat. No. 3,869,429, or to a tire cord, as described in the examples given in U.S. Pat. No. 4,259,404, then the product obtained will have a lower RFL-dip pickup. The improved RFL-dip pickup of the yarn according to the invention results in a more effective penetration into the yarn of the RFL-dip. This leads to improved service properties when the product is used as reinforcing material in rubber or synthetic materials, particularly as far as fatigue is concerned.

The yarn according to the invention being more readily accessible to RFL-dip is bound up with the magnitude of the stiffness number of the yarn. The stiffness number expressed in N/tex is defined as the product of the LASE 1% (Load at Specified Elongation), expressed in mN/tex in accordance with ASTM-D 885 M-79, and the twist factor, which are both determined on a cord made from the yarn according to the invention. It is preferred that the yarn according to the invention should have a stiffness number below 3000 N/tex, more particularly below 2500 N/tex. By the twist factor Tf, a dimensionless quantity, is to be understood the value $$Tf = n \sqrt{\frac{\text{linear density}}{\text{specific mass}}}$$

where n is the cord twist in turns per meter and the linear density is expressed in decitex. The specific mass is 1.4–1.5 g/cm$^3$ for usual filaments of poly-p-phenylene terephthalamide.

For the determination of the stiffness number of a particular yarn a cord is made having a twist factor of 16,000–17,000, for instance in the construction dtex 1680×2 (330S/330Z). Of this cord the LASE 1% is determined under standard conditions (ASTM D 885 M-79, section 20). The value found is multiplied by the twist factor of the cord. The product is the stiffness number of the yarn. The open structure of the cord made from the yarn of the invention can also be clearly demonstrated by immersing a short length, say 1 cm, in water. After a short time, for instance within 15 minutes, the cord will spontaneously separate into individual filaments. The improved absorption of RFL-dip of cords made from the yarn of the invention also manifests itself in the density of the cord provided with RFL-dip. Compared with a cord made in accordance with the prior art such a cord has a lower density.

In addition to the cured epoxy compound the yarns according to the invention may contain one or more of the usual finishes. It has been found that when the cord made from it is used as a reinforcing material for rubber, particularly the adhesion is improved when the yarn is provided with 0.1–5% by weight of one or more polyglycol esters of one or more fatty acids. It is preferred that the yarn should contain 0.3–1.0% by weight of a polyglycol ester of oleic acid. This product is commercially available under the name Leomin OR.

The yarn according to the invention may be wound into a yarn package while in a twistless or practically twistless state. The resulting yarn packages are particularly suitable to be used as starting material in the manufacture of cords to be employed as reinforcing elements for rubber or synthetic materials. Optionally, the yarn according to the invention may be twisted before it is wound into a package.

The yarn according to the invention is especially suitable to be processed into a reinforcing cord. This cord may be obtained by twisting together one or more bundles of multifilament yarn, of which bundles at least one entirely or partly consists of the filament yarn according to the invention. In one embodiment of the invention the cord is made by twisting together bundles of multifilament yarn which all entirely consist of the yarn according to the invention. In some other embodiment of the invention at least one of the bundles in the cord entirely or partly consists of a polyester multifilament yarn provided with an adhesive coating. A polyester yarn thus pretreated is described in U.S. Pat. No. 3,383,242.

The yarn according to the invention may be combined with other yarns, such as yarns of polyamide, regenerated cellulose, glass, steel and carbon. For instance, in the twisted or twistless state it may be combined into a cord with viscose rayon, nylon 6 and/or nylon 66. The yarns with which the yarn according to the invention is combined may or may not have been predipped. Generally, it will be possible for yarns of aliphatic polyamides or regenerated cellulose to be combined with the yarn according to the invention while in a non-predipped state.

An excellent embodiment is a cord made by twisting together at least two bundles of multifilament yarn, of which bundles at least one consists of the yarn according to the invention and of which other bundles at least one consists of regenerated cellulose. It is preferred that such a composite cord should consist of a poly-p-phenylene terephthalamide yarn according to the invention and a conventional viscose yarn not provided with any dip.

Composite cords of non-pretreated poly-p-phenylene terephthalamide yarn and viscose rayon are known from U.S. Pat. No. 4,389,839. The actually favourable properties of these known cords are further improved if use is made of the yarn according to the invention provided with an adhesive coating instead of non-pretreated poly-p-phenylene terephthalamide yarn. The invention also therefore relates to the compositie cords disclosed in U.S. Pat. No. 4,389,839 in which, however, there is incorporated poly-p-phenylene terephthalamide yarn according to the invention provided with an adhesive coating. A composite cord made up of the yarn according to the invention and a non-pretreated viscose rayon can readily be dipped on a conventional one-step apparatus to form a product having excellent reinforcing properties.

The yarn according to the invention provided with a cured epoxy coating or a cord made therefrom, as described hereinbefore, has the advantage that if desired it may be incorporated as reinforcing material into the so-called self-adhering rubbers without having to undergo any further dipping treatment. It is therefore suitable to be processed by users who do not possess any dipping equipment. For uses where high demands are made on the adhesion between the yarn or cord and the matrix material, a second adhesive coating is applied to the cured epoxy compound. It may have a composition which is identical with that of the second dip coating applied in the conventional two-step dipping process. It is preferred that the second adhesive coat should consist of a cured mixture of resorcinol, formaldehyde and a rubber latex.

The yarn according to the invention as such, or processed into cord or fabric may, while provided or not with a second adhesive coat, be used as reinforcing material for synthetic and natural polymers displaying a rubberlike behaviour and for other synthetic materials, among which thermoplastics and thermosetting plastics.

Examples of these materials include natural rubber, polybutadiene, polyisopropylene, poly(butadiene-styrene), poly(butadiene-acrylonitrile), poly(ethylene-propylene), poly(isobutene-isoprene), polychloroprene, polyacrylate, polyurethanes, polysulphides, silicones, polyvinyl chloride, polyetheresters, polymerized unsaturated polyesters and epoxy resins.

For the manufacture of the yarn according to the invention various methods may be used. These methods also form part of the invention. For instance, in fully continuous operation and directly coupled to the spinning process of the starting yarn a curable epoxy compound and one or more curing agents may be applied to the twistless yarn, followed by drying and/or curing of the epoxy compound. In a different embodiment the treatment of a twistless or practically twistless starting yarn with the curable epoxy compound is a separate continuous or discontinuous operation which is not integrated with the spinning process.

In all cases during curing the yarn tension is preferably above 5 mN/tex. The preparation of aromatic polyamides and the spinning thereof are described in Kirk-Othmer, Encyclopedia of Chemical Technology, 3rd Ed., Vol. 3 (1978), pp. 213–242. A particularly suitable method of wetspinning poly-p-phenylene terephthalamide into multifilament yarns is published in U.S. Pat. No. 4,320,081.

If coupled to a wetspinning process, the application of the curable epoxy compound may be effected during or between different process steps following the washing of the spun yarn. In a preferred procedure the epoxy compound and the appropriate curing agent are applied to the washed, non-dry yarn. It is preferred that use should be made of a dilute aqueous mixture (over 90% by weight of water) of the epoxy compound and one or more alkaline curing agents. The yarn thus treated is subsequently dried and optionally subjected to some special curing treatment, after which it is wound into a package. By applying the epoxy compound to the yarn when it is still wet and has not yet been dried beforehand, a yarn having a very low free epoxide content is obtained after à relatively short drying and/or curing treatment at a temperature not higher than 300° C. It is assumed that this favourable result is to be attributed to the high accessibility of the epoxy compound in the swollen structure of the freshly spun wet filaments. It is preferred that the curing agent used should be an amine, with the weight ratio epoxy compound/amine in the mixture to be applied to the yarn being in the range of 50:1 to 1:1. A preferred amine is piperazine. Optionally, use may be made of a mixture of amines, such as a mixture of piperazine and imidazole. It is preferred that the curable epoxy compound should entirely or mainly consist of the diglycidyl ether of glycerol. After applying the mixture of epoxy compound and curing agent the yarn is preferably dried at a temperature of 130°–250° C. and subsequently subjected to a curing treatment at a temperature of 150°–300° C.

For drying and curing use is made of conventional methods and equipment, such as hot drums, hot plates, hot rolls, hot gases, steam boxes, infrared heaters and the like. Preferably, neither the drying treatment nor the curing treatment should last longer than 10 seconds.

The above-described fully continuous process, in which the spinning of the yarn is combined with applying the epoxy compound to the wet yarn, may be carried out at yarn speeds which are commonly used in the spinning of poly-p-phenylene terephthalamide. Generally, the yarn passes through the successive process steps at a speed higher than 200 m/min, preferably higher than 300 m/min. The epoxy compound also may be applied to the yarn after it has been dried. This operation may be carried out in combination with the spinning process or separately. It has been found that also by that route, provided that proper conditions are used, a yarn is obtained which when in the freshly produced state has a sufficiently low content of free epoxide. A low free epoxide content is obtained by treating the yarn at elevated temperature. For reasons of economy and the possibly detrimental effect on the yarn properties, however, such a treatment is considered unattractive. It has been found that a product having a low free epoxide content is obtained by applying to a twistless or practically twistless, dried, poly-p-phenylene terephthalamide yarn a mixture containing the diglycidyl ether of glycerol, piperazine and/or imidazole and optionally subjecting the yarn thus treated to a curing treatment for 1 to 25 seconds at a temperature of 220° to 230° C. The amount of diglycidyl ether to be applied to the yarn is 0.01-5% by weight, preferably 0.3-1.0% by weight, calculated on the dry yarn. The piperazine and imidazole are each contained in the mixture to be applied to the yarn in an amount of 5-50%, preferably 10-40%, calculated on the weight of the diglycidyl ether.

Optionally, the epoxy compound and the curing agent are not applied to the yarn as a mixture but separately, either before or after the drying treatment. Thus, an epoxy compound (without curing agent) may be applied to non-dried yarn, which is subsequently dried, after which the epoxy compound is cured with a Lewis acid, for instance an etherate of $BF_3$, at room temperature. For further improvement of the adhesion of the product it may, after the curing treatment, be provided with 0.1 to 5.0% by weight, preferably 0.4–1,0% by weight, of a finish. A preferred finish is a polyglycol ester of a fatty acid or a fatty acid mixture, such as Leomin OR.

Instead or in addition the finish may be applied to the yarn in a previous stage of the process, for instance immediately before or after drying and simultaneously or non-simultaneously with the application of the epoxy compound. The epoxy compound, curing agents, catalyst and finish to be used are applied with the aid of known liquid applicators. To that end use may be made of a kiss-roll of which the surface that comes into contact with the yarn moves to the same direction as or in opposite direction of the yarn. The kiss-roll is wetted in the usual way with the liquid to be applied, for instance in that the rotating kissroll is partially immersed in the liquid.

The yarn according to the invention may be provided with the usual aids, such as surface active substances, antistatic substances and other commonly used finish constituents. The processes according to the invention permit the rapid manufacture with simple means of yarn packages of pretreated multifilament yarn from an aromatic polyamide, more particularly poly-p-phenylene terephthalamide, which does not contain free epoxy compounds in an amount detrimental to human health, and which results, either without any further dipping treatment or after a one-step dipping treatment, in a reinforcing material displaying favourable adhesion and fatigue behaviour.

The free epoxide content of the yarn is in principle determined as follows. Of the yarn 2 g are extracted for 2 hours with dichloromethane in a Soxhlet extractor. The extract is evaporated to dryness in a rotating vacuum evaporator at room temperature. After the addition of a particular amount of dichloromethane the epoxide content is determined as follows: the solution is allowed to react for 20 minutes at room temperature with a solution of 2,4-dinitrobenzene sulphonic acid in dioxan. Subsequently, the solution is rendered alkaline with tetrabutyl ammonium hydroxide and the resulting orange colour is measured spectrophotometrically at 498 nm.

As agents are used:
a. dichloromethane A.R.
b. 2,4-dinitrobenzene sulphonic acid (e.g. of Eastman Kodak), 0,4% (m/v) in dioxan A.R.
c. tetrabutyl ammonium hydroxide, 0.1 mole/l in propanol/methanol (e.g. of the firm of Merck)

The procedure for determining the free epoxide content of the yarn of the invention is as follows:
a. Weigh into an extraction tube about 2 g of yarn to the nearest 1 mg (p grammes).
b. Extract in a Soxhlet apparatus for 2 hours with dichloromethane.
c. Evaporate the dichloromethane extract to dryness at room temperature with the aid of a rotating vacuum evaporator.
d. Add by pipette 1 ml of dichloromethane and properly mix with swirling. (When after evaporation the residue contains more than 1.5 micromoles of epoxide, a larger volume of dichloromethane is accurately added by pipette and an aliquot is transferred to a 10-ml volumetric flask, after which proceed as directed of from e).
e. Add 1 ml of 2,4-dinitrobenzene sulphonic acid solution and properly mix with swirling.
f. After 20 minutes add 1 ml of tetrabutyl ammonium hydroxide solution with vigorous stirring. Add by pipette 7 ml of dichloromethane, again with vigorous stirring.
g. Exactly 5 minutes after adding the tetrabutyl ammonium hydroxide measure the absorbance of the solution against water as a blank, using a 1-cm cell (measured absorbance $E_1$; after adding the base, the colour first deepens; after 5 min. it remains reasonably constant for a few minutes and then begins to fade).
h. Run a blank in the same way, starting at d (measured absorbance $E_0$).
i. Read from the calibration graph constructed as described below the amount of epoxy groups (q moles) corresponding to $E_1-E_0$.

The calibration graph is obtained as follows:
j. Prepare a standard solution of the diglycidyl ether of glycerol, using the following procedure: dissolve of a commercial product, e.g. GE 100 (firm of Raschig GmbH) about 150 mg in dichloromethane and dilute to 100 ml. Dilute 10 ml of this solution to 100 ml. This dilute solution contains about 1 $\mu$mole of epoxide/ml. The exact concentration is calculated via determination of the content of the commercial product used (e.g., GE 100), as further described hereinafter.

k. Apply the procedure as directed of from e. to 0.2; 0.4; 0.6; 0.8 and 1.0 ml of the dilute standard solution.

l. Plot in a graph the epoxide concentrations (in μmole/10 ml of test solution) against the respective absorbance values.

The determination of the epoxide content of the commercial product (e.g. GE100 of Raschig GmbH) used for the preparation of the standard solution is carried out as follows:

m. Weigh out about 250 mg of the commercial product (a grammes), dissolve in glacial acetic acid and make up to 100 ml in a volumetric flask.

n. Pipette 25 ml of this solution into a 100-ml beaker and add by pipette 25 ml of cetyltrimethyl ammonium bromide reagent (16 g in 200 ml of glacial acetic acid).

o. Potentiometrically titrate with perchloric acid in glacial acetic acid (0.1 mole/l=t moles/l) ($v_1$ ml).

p. Run a blank-titration with the chemicals used ($v_o$ ml)

The commercial product then contains:

$$\frac{4(v_1 - v_0)t}{a} \text{ mmoles epoxide/gramme}$$

(in constructing the calibration graph for the determinations that were carried out within the scope of the examples of the present invention use was made of a commercial product GE100 containing 6.7 mmoles epoxy/gramme).

The free epoxide content of the yarn is:

$$\frac{q}{p} \text{ mmoles epoxide/kg yarn,}$$

where
q=μmoles epoxide found in the sample solution,
p=grammes of yarn weighed in before the extraction.

The tenacity, the elongation at rupture, the LASE 1% and the initial modulus of the fibres in accordance with ASTM D 885 are measured on a twistless yarn forming a bundle of filaments or on a cord with the aid of an Instron tensile tester (of Instron Engineering Corp., Canton, Mass., USA).

The yarns are previously twisted to 90 t/m. To determine the LASE 1% of a cord, it is given a pre-tension of 20 mN/tex. For all measurements the samples are conditioned for 16 hours at a temperature of 20° C. and a relative humidity of 65%. The measurements are carried out in an accordingly conditioned room.

The tensile tests are carried out fivefold on samples having a gauge length of 50 cm and at a constant tensile rate of 5 cm/min.

The linear density of a fibre sample is determined by weighing a sample of a particular length (100 cm under a tension of 0.1 cN/dtex). The density of yarn and cord samples is measured in a density-gradient tube at 23° C.

The adhesion of the cords to rubber is determined in accordance with the H-test method described in ASTM D 2138-72. The results are expressed as a percentage of standard two-dip cord (procedure described in Example VI, yarn B). Moreover, the percentage of rubber coverage (RC) is mentioned.

The invention will be further described in the following examples.

EXAMPLE I

This example illustrates the procedure of applying an epoxy compound and a curing agent to a wet, not previously dried, twistless yarn in an operation integrated with the spinning process.

A spinning mass was prepared by mixing concentrated (99.8 wt.%) sulphuric acid snow with powdered poly-p-phenylene terephthalamide having an inherent viscosity of 5.2. The inherent viscosity was calculated from the efflux times of a solution of the polymer in 96 wt.% sulphuric acid (0.5 g of polymer in 100 ml) and the neat solvent measured in a capillary viscometer at 25° C. The spinning mass contained 19.0% by weight of poly-p-phenylene terephthalamide.

The spinning mass was deaerated, heated to 90° C. in a single-screw extruder and fed to a spinneret via a filter and a spinning pump. The spinneret had 1000 spinning orifices 60 μm in diameter. The spinning mass was extruded through the spinning orifices and thereafter successively passed through an air zone 8 mm in length and a coagulation bath. This bath was a dilute solution of sulphuric acid in water (about 5% by weight) having a temperature of about 10° C. The filament bundle thus formed successively passed through a neutralization bath containing a dilute sodium carbonate solution and a washing bath in which the filaments were thoroughly washed with water of about 75° C. Excess adhering water was removed with the aid of a squeeze roller pair. The non-dried bundle of filaments subsequently passed over a first kissroll which was partially immersed in a mixture containing an epoxy compound, an alkaline curing agent, a surfactant and demineralized water. From this kiss-roll the yarn picked up 20–30% by weight of said mixture. Next, the yarn was passed over a series of eight drying drums at a temperature of 170° C. The yarn was in contact with the surface of the drums for 4–5 seconds in all. Subsequently, the yarn passed over a series of four curing drums (contact time 2.5 seconds) at a temperature of 240° C. (in one of the experiments the temperature was 170° C.). Next, the yarn was provided with 0.6% by weight of Leomin OR as after-finish with the aid of a liquid applicator consisting of a pin and a feed pump, after which the yarn was wound into a package at a speed of 250 m/min. The yarn obtained had a linear density of dtex 1680.

The following process conditions were varied:
a. the composition of the mixture containing the epoxy compound and applied by the first kiss-roll;
b. the temperature of the curing drums;
c. part of the yarns were provided with an after-finish and part of the yarns were not after-finished.

The properties of the resulting yarns are summarized in Table A.

TABLE A

| Experiment No. | 1A | 1B | 1C | 1D | 1E |
|---|---|---|---|---|---|
| Mixture applied with 1st kiss-roll composition | a | a | b | c | d |
| amount on yarn (wt. %) | 0,4 | 0,6 | 0,9 | 1,2 | 0,6 |
| Curing temperature (°C.) | 240 | 240 | 240 | 240 | 170 |
| Amount of after-finish (wt. %) | 0,6 | 0,6 | 0,0 | 0,0 | 0,6 |
| Yarn properties | | | | | |
| Adhesion (rel. %) | 100 | 100 | 100 | 95 | 90 |
| RC (%) | 70 | 70/70 | 70 | 60 | 70 |
| Free epoxide content (in mmoles/kg) | 1,7 | 4,1 | 5,3 | 6,6 | 2,4 |

The compositions a–d of the mixture applied with the 1st kiss-roll and the amounts thereof in percentages by weight are given in Table B.

TABLE B

| Composition | a | b | c | d |
|---|---|---|---|---|
| Diglycidylether of glycerol (GE 100 supplied by Raschig) | 1,98 | 1,98 | 1,98 | 1,20 |
| Piperazine 6 aq. | 0,22 | 0,22 | 0,22 | 0,25 |
| Aerosol OT (5%)* | 0,25 | | | |
| Leomin OR** | | 1,10 | 2,20 | |
| Imidazole | | | | 0,25 |
| Ethylene glycol | | | | 0,30 |
| Ethanol | | | | 19,6 |
| Demineralized water | 97,55 | 96,70 | 95,60 | 78,4 |

*Aerosol OT is a surfactant supplied by American Cyanamid Company and consists of dioctyl sodium sulphosuccinate.
**Leomin OR is a finish marketed by Hoechst and consists of fatty acid polyglycol esters.

EXAMPLE II

This example illustrates the application of an epoxy compound-curing agent mixture to a dried twistless yarn in an operation integrated with the spinning process.

The same procedure was used as in Example I, with the exception of the following changes. After the washing treatment the filament bundle while still wet was provided with 0.1% by weight of Leomin OR with the aid of a first rotating kiss-roll. Subsequently, the yarn was passed over a series of eight drying drums at a temperature of 170° C., the contact time between the yarn and the surface of the drums being 4 to 5 seconds. Next, the yarn passed over a second rotating kiss-roll, with the aid of which the yarn was provided with an epoxy compound-curing agent mixture dissolved in water or in a mixture of ethanol and water (mixing ratio 1:1). The yarn thus wetted was passed over the curing drums (240° C., contact time 2.5 seconds). The yarn thus treated was then provided with 0.6% by weight of Leomin OR with the aid of a liquid applicator consisting of a pin and a feed pump. Finally, the yarn was wound into a package at a speed of 250 m/min. The yarn had a linear density of dtex 1680. The results are given in Table C.

TABLE C

| Experiment No. | 2A | 2B | 2C |
|---|---|---|---|
| Mixture applied by 2nd kiss-roll composition | e | e | f |
| amount on yarn (wt. %) | 0,4 | 0,6 | 0,6 |
| Free epoxide content of yarn (mmoles/kg) | 7,0 | 9,8 | 0,8 |
| immediately after winding | | | |
| after 1 week's storage at room temperature | 3,0 | 0,1 | |

The compositions e and f of the mixture applied with the 2nd kiss-roll and the amounts in percentages by weight are given in Table D.

TABLE D

| Composition | e | f |
|---|---|---|
| Diglycidylether of glycerol (GE 100 supplied by Raschig) | 1,98 | 1,95 |
| Piperazine 6 aq. | 0,22 | 0,3 |
| Aerosol OT (5%) | 0,25 | |
| Imidazole | | 0,45 |
| Ethylene glycol | | 0,3 |
| Ethanol | | 48,5 |
| Demineralized water | 97,55 | 48,5 |

EXAMPLE III

The procedure described in Example I was repeated, the washed bundle of filaments being subjected to the following, varied treatment. The filament bundle, which had not been dried yet, was wetted with a mixture of 2.5% by weight of GE 100 (diglycidyl ether of glycerol) and 97.5% by weight of water. The yarn picked up 0.6% by weight of the epoxy compound. Next, the yarn was passed over a series of eight drying drums at a temperature of 170° C., contact time 4–5 seconds. Subsequently, the yarn passed through a chamber (for about 2 seconds) at room temperature filled with the vaporous diethyl etherate of $BF_3$. The yarn was then provided with 0.6% by weight of Leomin OR with the aid of a liquid applicator (pin and feed pump) and wound into a package. Immediately following the winding operation the free epoxide content of the yarn was determined in duplicate and was found to be 0.9 and 1.2 mmoles/kg, respectively. An experiment carried out under the same conditions, except that the treatment with the $BF_3$ etherate was omitted, yielded a yarn having a free epoxide content of 38.0 and 38.0 mmoles/kg, respectively.

EXAMPLE IV

This example illustrates the application of a curable epoxy compound to a dried yarn in an operation not directly coupled to the spinning process.

A dry yarn of poly-p-phenylene terephthalamide was provided with 0.8% by weight of Leomin OR and wound into a yarn package. The resulting dry, twistless yarn was subjected to the following treatments. The yarn package was rollingly unwound while successively passing the yarn over a rotating kiss-roll, through a steam box (temperature 230° and 280° C., respectively, residence time 12 seconds), past a liquid applicator and finally wound. With the kiss-roll the yarn was coated with a mixture whose composition is mentioned in Table D under e. With the liquid applicator the yarn was provided with 0.6% by weight of Leomin OR. The yarn thus treated contained 0.6% by weight of resin.

The free epoxide content of the yarn cured at 240° and 280° C., respectively, was 9.0 and 7.5 mmoles/kg, respectively.

EXAMPLE V (COMPARATIVE)

Two yarns of poly-p-phenylene terephthalamide were made:
A. in accordance with Example 4a of U.S. Pat. No. 4,121,901;
B. in accordance with Example 4b of U.S. Pat. No. 4,121,901.

Of these yarns the adhesion to rubber and the free epoxide content were determined. The results are summarized in Table E.

TABLE E

| | US 4 121 901 | |
|---|---|---|
| | Ex. 4a | Ex. 4b |
| Adhesion (rel. %) | 70 | 90 |
| RC (%) | 40 | 60 |
| Free epoxide content (mmoles/kg) immediately after drying and curing, resp. | 30,7 | 17,5–17,7 |
| after 1 week (at room temperature) | 22,2 | 15,9–16,6 |
| after 2 weeks (at room temperature) | 19,1 | 15,8–16,0 |

These results show the permanently high free epoxide content of prior art yarns.

EXAMPLE VI

Two yarns of poly-p-phenylene terephthalamide each having a linear density of dtex 1680 and being composed of 1000 filaments were made as follows:

A. A yarn was spun and treated with an epoxy compound-curing agent mixture as described in Example I, experiment 1A. In the curing treatment, however, the yarn was passed through a steam box (temperature 240° C., residence time 5 sec.) and the resin was applied to the yarn in an amount of 0.6% by weight.

B. A yarn was spun, washed and dried in the same way as described in Example I, except that no epoxy compound-curing agent mixture was applied to the yarn.

The yarns A and B were further processed by twisting two filament bundles of each of these yarns to 330 turns/m and combining the resulting bundles into a cord having a twist which was equal to but in opposite direction to that of the bundle. Thus of the yarns A and B cords with the construction dtex 1680×2 (330/330) were obtained. In a similar way the yarns A and B were formed into cords having the constructions dtex 1680×3 (270/270) and dtex 1680×2×3 (190/190).

The cords made from the yarn B were dipped with an epoxy compound under conditions usually employed in two-dip processes. The procedure was as follows. The cord to be treated is fed to a trough filled with dip liquor, in which the cord is passed over a roll while under a tension of 25 mN/tex. After emerging from the dip bath the cord, while maintained under the same tension, passes through an oven in which it is heated for 60 seconds at a temperature of 245° C. The cord thus provided with an epoxy compound is wound into a package.

The composition of the dip liquor is as follows (the percentages are by weight):

| | |
|---|---|
| demineralized water | 86,0% |
| NaOH 5% | 2,0% |
| caprolactam | 10,0% |
| diglycidyl ether of glycerol | 2,0% |

The amount of resin applied to the cord is 0.2 to 0.5% by weight. The properties of the cords thus obtained are summarized in Table F. This table also mentions the properties of the respective cords after they have been provided with a resorcinol-formaldehyde-latex (RFL) dip in the manner usual in the art. To that end the cords while under a tension of 25 mN/tex are fed into a bath of RFL dip liquor and subsequently heated for 90 seconds at 230° C. while kept under the same tension.

The RFL-dip contained 20% by weight of solid matter and had been obtained by mixing 524.0 parts of water, 37.0 parts of precondensed resorcinol-formaldehyde resin (75%), 18.6 parts of formalin (37%), 410 parts of vinyl pyridine latex (of Gentac, supplier General Tire, 41%) and 10.4 parts of ammonia (25%). All parts are by weight.

TABLE F

| Yarn | A (invention) | | | B (control) | | |
|---|---|---|---|---|---|---|
| Cord (with epoxy coat, with out RFL-coat) | 1680×2 | 1680×3 | 1680×2×3 | 1680×2 | 1680×3 | 1680×2×3 |
| Linear density(dtex) | 3535 | 5391 | 10899 | 3553 | 5229 | 10649 |
| Tenacity N | 471,1 | 744,3 | 1402,0 | 475,6 | 749,7 | 1436,0 |
| Elongation % | 5,19 | 5,97 | 6,19 | 4,50 | 5,02 | 4,86 |
| LASE 1% mN/tex | 140,0 | 105,7 | 96,9 | 233,8 | 209,2 | 190,9 |
| Density g/ml | 1,447 | 1,445 | 1,445 | 1,454 | 1,452 | 1,456 |
| Twist factor | 16311 | 16492 | 16501 | 16313 | 16203 | 16249 |
| Stiffness No N/tex | 2284 | 1743 | 1599 | 3814 | 3390 | 3102 |
| Cord (with epoxy coat, with RFL coat) | | | | | | |
| Linear density(dtex) | 3923 | 6065 | 12011 | 3826 | 5661 | 11551 |
| Tenacity N | 532,7 | 769,2 | 1546,0 | 545,5 | 730,4 | 1459,0 |
| Elongation % | 4,92 | 5,02 | 5,70 | 4,68 | 5,01 | 5,23 |
| LASE 1% N | 83,07 | 124,7 | 203,8 | 94,15 | 128,2 | 223,3 |
| Density g/ml | 1,399 | 1,400 | 1,395 | 1,416 | 1,415 | 1,418 |

From the data in Table F on density and linear density it follows that cords made from the yarn of the invention have a higher RFL dip pickup than the prior art cords. In agreement with this finding is that the cords of the invention have a stiffness number below 3000 N/tex.

EXAMPLE VII

This example illustrates the application of an epoxy-curing agent mixture containing a catalyst.

A yarn of poly-p-phenylene terephthalamide (1680 dtex f1000) was spun according to the procedure described in Example I. After the washing treatment the filament bundle while still wet was provided with 0.1% by weight of Leomin OR with the aid of a rotating kiss-roll, dried and wound into a yarn package. The dry twistless yarn was subjected to the following treatments. The yarn package was rollingly unwound while successively passing the yarn over a rotating kiss-roll, through a steam box (temperature 240° C., residence time 16 seconds) and then the yarn was wound into a package. With the kiss-roll the yarn was coated with a mixture whose composition is mentioned in Table G. The results are summarized in Table H.

TABLE G

| Composition | g | h | i |
|---|---|---|---|
| Diglycidylether of glycerol (GE 100 supplied by Raschig) | 1,98 | 1,98 | 1,98 |
| Piperazine 6 aq. | 0,22 | 0,22 | 0,22 |
| Aerosol OT (5%) | 0,25 | 0,25 | 0,25 |
| Epilink 230* | | 0,11 | 0,22 |
| Demineralized water | 97,55 | 97,44 | 97,33 |

*Epilink 230 is a catalyst supplied by Akzo Chemie and consists of a technically pure 2,4,6-tris(dimethylaminomethyl)phenol.

TABLE H

| Experiment No. | 7A | 7B | 7C |
|---|---|---|---|
| Mixture applied with kiss-roll composition | g | h | i |
| amount on yarn (wt. %) | 0,6 | 0,6 | 0,6 |
| Yarn properties | | | |
| Adhesion (rel. %) | 95 | 80 | 75 |
| RC (%) | 60 | 40 | 30 |
| Free epoxide content (in mmoles/kg) immediately after winding | 6,2 | 1,7 | 0,5 |

We claim:

1. A multifilament yarn which consists of an aromatic polyamide and is provided with an adhesive coating of a cured epoxy compound, characterized in that the yarn has a free epoxide content not higher than 10 mmoles/kg, the epoxide compound having been applied to the yarn and cured while the yarn has a twist of fewer than 10 turns per meter.

2. A yarn according to claim 1, characterized in that the free epoxide content is lower than 2 mmoles/kg.

3. A yarn according to claim 1, characterized in that the yarn has a stiffness number lower than 3000 N/tex.

4. A yarn according to claim 1, characterized in that the yarn consists of poly-p-phenylene terephthalamide.

5. A yarn according to claim 1, characterized in that the yarn has a twist of fewer than 10 turns per meter.

6. A yarn according to claim 1, characterized in that the adhesive coating is obtained by curing a mixture comprising an epoxy compound and one or more alkaline curing agents.

7. A yarn according to claim 6, characterized in that the adhesive coating is obtained by curing a mixture comprising a diglycidyl ether of glycerol and an amine.

8. A yarn according to claim 7, characterized in that the amine is piperazine.

9. A yarn according to claim 6, characterized in that the adhesive coating is obtained by curing a mixture comprising the diglycidyl ether of glycerol, piperazine, imidazole and ethylene glycol.

10. A yarn according to claim 1, characterized in that the yarn contains 0.3–1% by weight of the adhesive coating consisting of a cured epoxy compound.

11. A yarn according to claim 1, characterized in that the yarn is also provided with 0.1–5% by weight of one or more polyglycol esters of one or more fatty acids.

12. A yarn according to claim 11, characterized in that the yarn contains 0.3–1.0% by weight of a polyglycol ester of oleic acid.

13. A yarn package, characterized in that it contains a continuous yarn length of a multifilament yarn consisting of poly-p-phenylene terephthalamide, which yarn has a twist of fewer than 10 turns per meter, provided with an adhesive coating of a cured epoxy compound and has a free epoxide content of less than 2 mmoles/kg.

14. A fabric made of a yarn according to claim 1.

15. A fibre-reinforced object, of which the reinforcing material consists of a yarn, according to claim 1.

* * * * *